United States Patent [19]

Marsh et al.

[11] Patent Number: 5,048,335
[45] Date of Patent: Sep. 17, 1991

[54] CAPACITANCE-TYPE MATERIAL LEVEL INDICATOR

[75] Inventors: Norman F. Marsh, Port Huron; John R. Schutt, Lexington; Bruce W. Campbell, Port Huron, all of Mich.

[73] Assignee: Bindicator Company, Port Huron, Mich.

[21] Appl. No.: 103,389

[22] Filed: Oct. 1, 1987

[51] Int. Cl.⁵ .............................................. G01F 23/26
[52] U.S. Cl. .................... 73/304 C; 324/601; 335/207; 361/284
[58] Field of Search ............................ 73/304 C, 1 H; 324/61 R, 61 P, 130, 601; 340/870.04, 617, 620; 335/205, 207; 361/173, 174, 175, 284; 200/61.02, DIG. 36

[56] References Cited

U.S. PATENT DOCUMENTS

| | | | |
|---|---|---|---|
| 2,859,960 | 11/1958 | Magondeaux | 361/173 |
| 3,418,610 | 12/1968 | Hammond | 335/205 |
| 3,691,490 | 9/1972 | Ragni | 335/205 |
| 4,369,481 | 1/1983 | Early | 361/173 |
| 4,499,766 | 2/1985 | Fathauer et al. | 73/304 C |
| 4,590,575 | 5/1986 | Emplit | 73/304 C |
| 4,676,100 | 6/1987 | Eichberger | 73/304 C |
| 4,723,122 | 2/1988 | Maltby et al. | 73/304 C |

*Primary Examiner*—William A. Cuchlinski, Jr.
*Attorney, Agent, or Firm*—Barnes, Kisselle, Raisch, Choate, Whittemore & Hulbert

[57] ABSTRACT

A system for indicating the level of material in a vessel as a function of material capacitance comprising a resonant circuit including a capacitance probe adapted to be disposed in a vessel so as to be responsive to variations in capacitance as a function of material level. An oscillator has an output coupled to the resonant circuit and to a phase detector for detecting variations in phase angle as a funciton of probe capacitance. Level detection circuitry is responsive to an output of the phase detector and to a reference signal indicative of a level of material for indicating material level as a function of a difference between capacitance at the probe and the reference signal. In the preferred embodiments of the invention disclosed, an automatic calibration circuit adjusts the resonance characteristics of the parallel resonant circuit in a predetermined or preprogrammed manner during a calibration operation to a point indicative of the predetermined reference material level. A timer measures the duration of the automatic calibration operation for indicating conditions at the probe, such as the amount of material coated onto the probe. A reed switch is positioned adjacent to the cover of a housing which encloses the electronics and is responsive to variations in magnetic flux from externally of the housing for indicating a calibration operation without removing the housing cover.

10 Claims, 5 Drawing Sheets

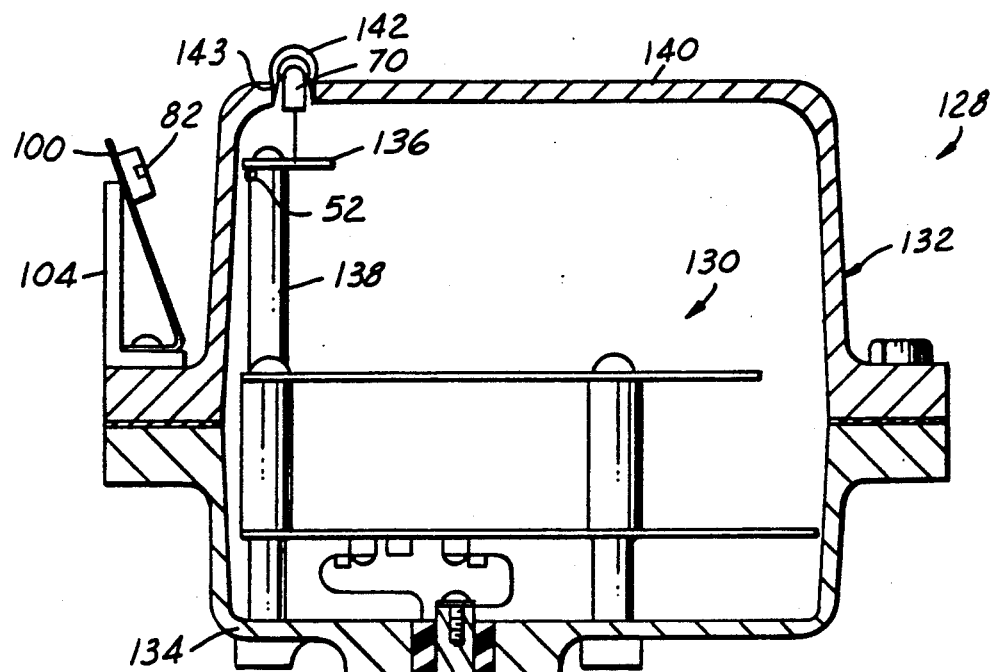
FIG.6
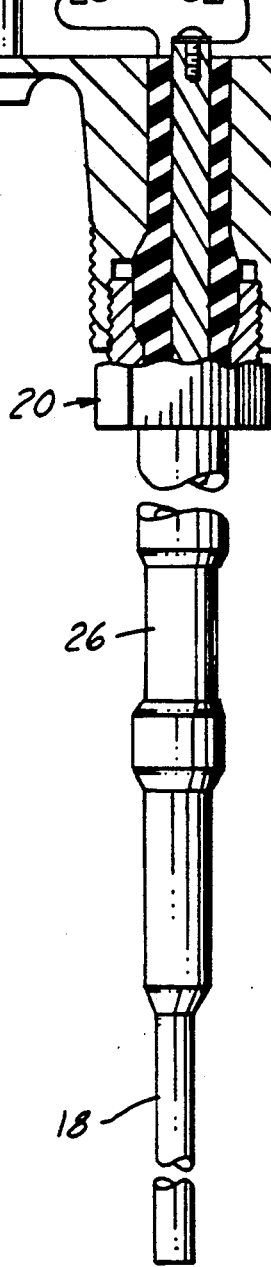

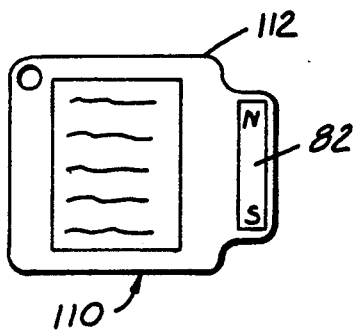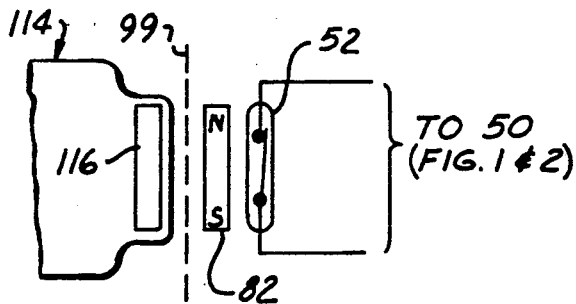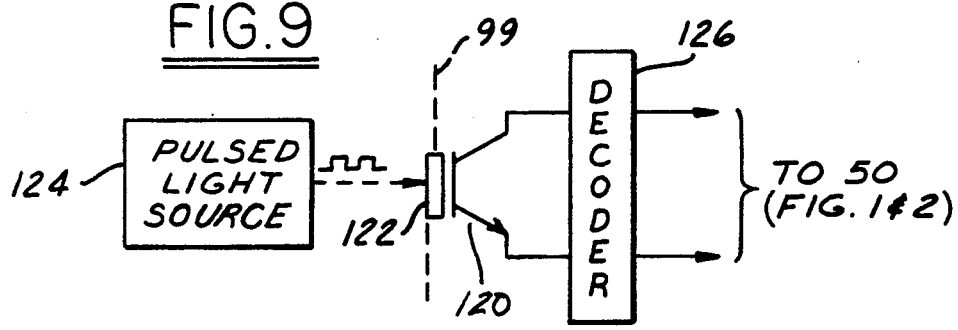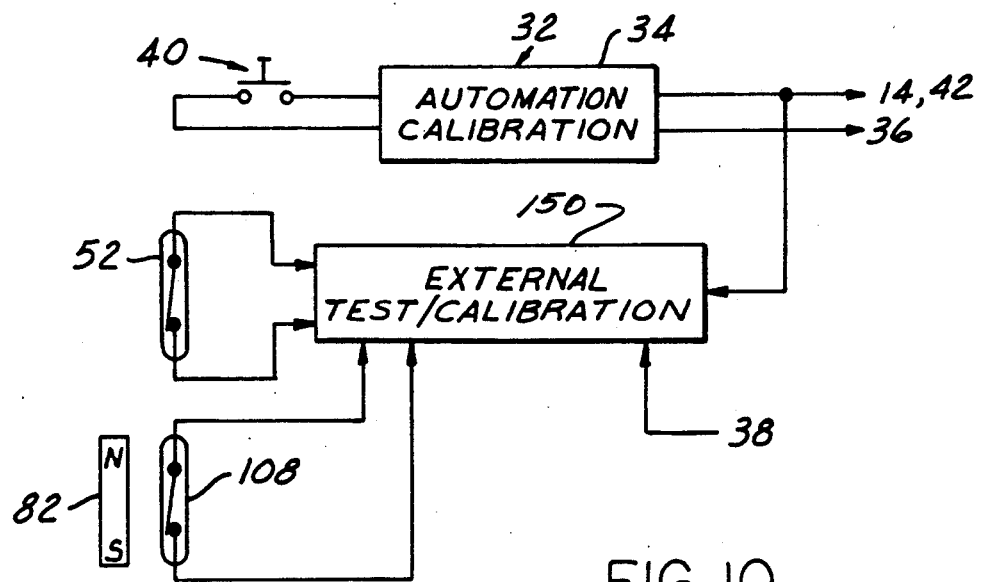

CAPACITANCE-TYPE MATERIAL LEVEL INDICATOR

The present invention is directed to systems for indicating level of material in a storage vessel or the like, and more particularly to an improved system of the described character for indicating level of material as a function of material capacitance.

Use of capacitance-type detection techniques for sensing level of material in a storage vessel has been widely proposed and is reasonably well understood in the art. In general, calibration in the field has been a time-consuming and laborious process requiring the efforts of a skilled or semi-skilled operator. There has been a need in the art for a system embodying facility for automatic on-demand calibration which does not require intervention by a skilled operator.

U.S. Pat. No. 4,499,766 discloses a system and probe for indicating the level of material in a vessel as a function of material capacitance. The disclosed system includes a resonant circuit having a capacitance probe adapted to be disposed in a vessel so as to be responsive to variations in capacitance as a function of material level. An oscillator has an output coupled to the resonant circuit and to a phase detector for detecting variations in phase angle as a function of probe capacitance. Level detection circuitry is responsive to an output of the phase detector, and to a reference signal indicative of a predetermined level of material, for indicating material level as a function of a difference between the reference signal and capacitance at the probe. In the preferred embodiments disclosed in such application, a push-button automatic calibration circuit adjusts the resonance characteristics of the parallel resonant circuit, or adjusts the reference signal indicative of a predetermined reference material level.

U.S. Pat. No. 4,624,139 discloses a material level indicating system which includes a bridge circuit with a capacitance material level probe in one bridge arm. An adjacent bridge arm includes a plurality of fixed capacitors coupled to controlled electronic switches for selective connection into the bridge circuit. The bridge circuit is powered by an oscillator, and a differential amplifier is connected across the bridge circuit for detecting balance conditions at the bridge. A push-button automatic calibration circuit includes a digital counter having outputs connected to the electronic switches. A comparator is responsive to the differential amplifier for enabling operation of the counter during a calibration mode of operation for selectively connecting the fixed capacitors into the bridge circuit until a preselected balance condition, corresponding to a preselected reference material level, is obtained. Thereafter, the differential amplifier is responsive to variation of probe capacitance from the reference level to indicate material level.

Automatic calibration technology discussed in the preceding paragraphs has enjoyed substantial commercial acceptance and success in the material level control market. The control electronics is mounted within a housing from which the measurement probe integrally projects. The assembly is constructed to be removably mounted to the wall of a material vessel, and the electronics includes facility for connection to remote level-indicating circuitry. However, a drawback in this technology in applications requiring explosion-proof housings is that the calibration push-button may not be mounted on the housing. Thus, automatic calibration requires removal of the housing cover in order to activate the calibration switch. Another potential problem lies in the fact that an operator may inadvertently initiate a calibration operation when the vessel is not empty, whereupon the level-indicating circuitry will be improperly calibrated.

A general object of the present invention is to provide facility for initiating a calibration operation in level-indicating systems of the above-described character which does not require removal of the housing cover and which preserves explosion-proof integrity of the housing. Another object of the invention is to provide a system of the described character in which initiation of a calibration operation is inhibited when the material in the vessel is at a level other than the appropriate level for calibration purposes.

The invention, together with additional objects, features and advantages thereof, will be best understood from the following description, the appended claims and the accompanying drawings in which:

FIG. 6 is a fragmentary sectional view of apparatus in accordance with a second embodiment of the invention;

FIG. 7 is a plan view of a device for selectively initiating test of the apparatus illustrated in FIGS. 1-4;

FIGS. 8 and 9 are fragmentary schematic illustrations of calibration actuation apparatus in accordance with respective modified embodiments of the invention; and FIG. 10 is a fragmentary functional block diagram illustrating a modification to the system of FIG. 1.

The disclosures of above-noted U.S. Pat. Nos. 4,499,766 and 4,624,139, both assigned to the assignee hereof, are incorporated herein by reference for background disclosures of push-button automatic calibration circuitry in accordance with preferred implementations of the present invention.

Figure 1:
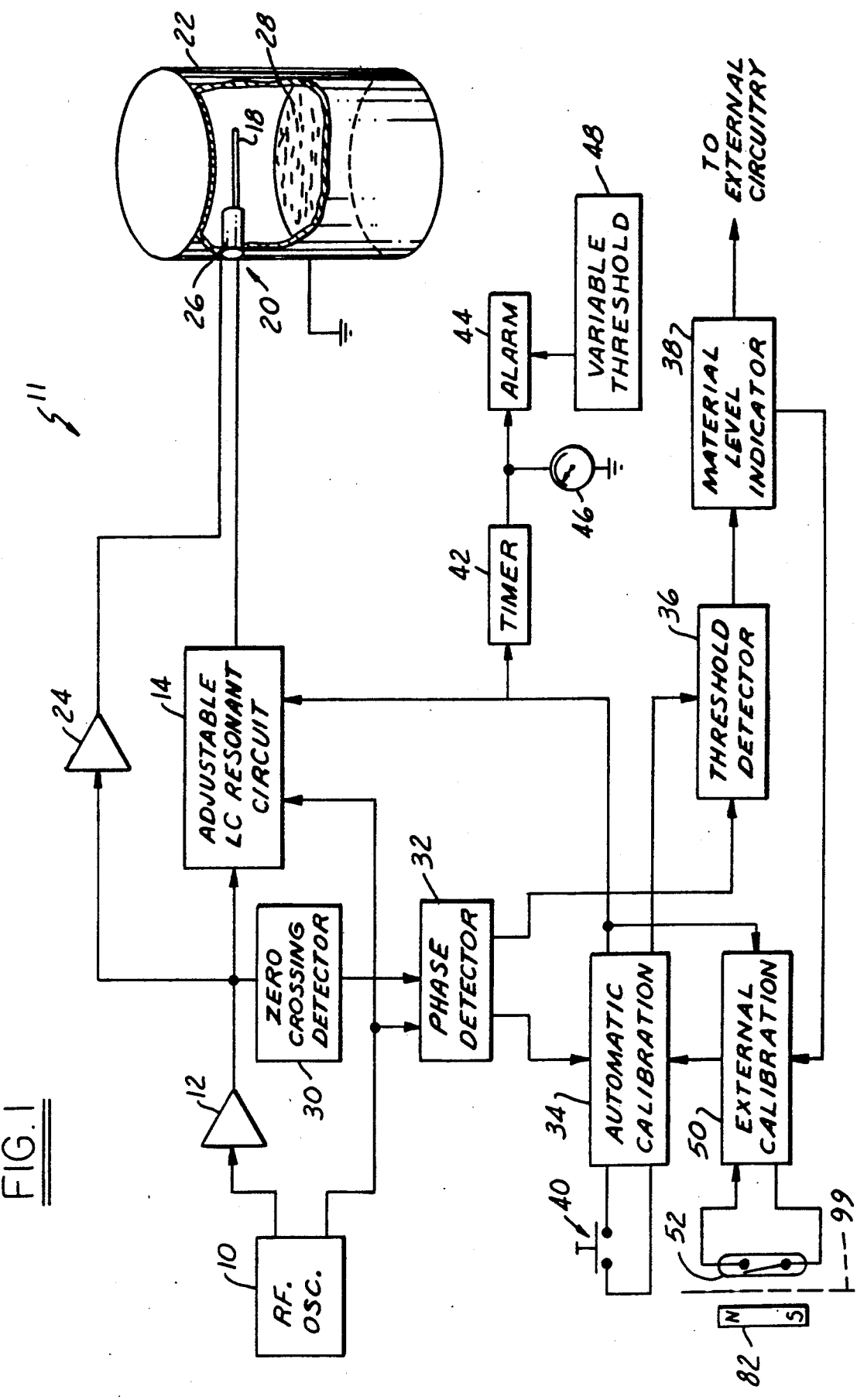
FIG. 1 is a functional block diagram of a presently preferred embodiment of a capacitance-type material level indicating system in accordance with the invention.

FIG. 1 illustrates a presently preferred embodiment 11 of a material level indicating system in accordance with the invention as comprising an rf oscillator 10 which provides a periodic signal at a first output to a phase shift (ninety degrees) amplifier 12. The sinusoidal output of amplifier 12 is connected to an adjustable parallel LC resonant circuit 14. Resonant circuit 14 is connected to the probe conductor 18 of a probe assembly 20 (FIG. 1) mounted in the side wall of a storage vessel 22. The output of amplifier 12 is also connected through a unity-gain amplifier 24 having low output impedance to the guard shield 26 of probe assembly 20. The wall of vessel 22, which may be a storage bin for solid materials or a liquid storage tank, is connected to ground. As is well-known in the art, the capacitance between probe conductor 18 and the grounded wall of vessel 22 varies with the level of the material 28 stored therein and with material dielectric constant. This variation in capacitance is sensed by the remainder of the system electronics to be described thereafter, and in greater detail in the referenced patents to provide the desired indication of material level. Guard shield 26, which is energized by amplifier 24 at substantially the same voltage and phase as probe conductor 18, functions to prevent leakage of probe energy through material coated onto the probe surface, and thus to direct probe radiation outwardly into the vessel volume so as to be more closely responsive to the level of material stored therein.

The sinusoidal output of amplifier 12 is fed through a zero-crossing detector 30 to one input of a phase detector 32. Phase detector 32 receives a square-wave second input from a second output of oscillator 10 one hundred eighty degrees out of phase with the oscillator output directed to amplifier 12. A first output of phase detector 32, which is a d.c. signal at a level proportional to the phase relationship between the respective inputs, and thus responsive to variations in phase angle of the oscillator probe drive output due to changes in probe capacitance, is fed to an automatic calibration circuit 34. A second output of phase detector 32, which is also a d.c. signal indicative of input phase relationship, is directed to one input of a threshold detector 36. The outputs of phase detector 32 are identical but effectively isolated from each other. Automatic calibration circuit 34 provides a control input to adjustable LC resonant circuit 14, which receives a second input for adjustment purposes from oscillator 10. Calibration circuit 34 also provides a reference input to threshold detector 36. The output of threshold detector 36 is fed through material level indicating circuitry 38 to external circuitry for controlling and/or indicating vessel material level as desired.

In general, automatic calibration circuitry 34 functions to adjust the resonance characteristics of resonant circuit 14 during a calibration mode of operation initiated by an operator push-button 40 connected thereto so as to establish, in effect, a reference capacitance level indicative of a preselected material condition in vessel 22 which exists during the automatic calibration mode. Preferably, the level of material in vessel 22 is first raised (by means not shown) to the level of probe assembly 20, and then lowered so as to be spaced from the probe assembly. If material 28 is of a type which coats the probe assembly, such coating will remain on the probe and be taken into consideration during the ensuing calibration operation. With the material level lowered, an operator may push button 40 to initiate the automatic calibration mode of operation. The resonance characteristics of circuit 14 are then automatically varied or adjusted by calibration circuit 34 in a preselected or preprogrammed manner until the output of phase detector 32 indicates that the return signal from the parallel combination of resonant circuit 14 and capacitance probe 18 bears a preselected phase relationship to the oscillator reference input to phase detector 32, which phase relationship thus corresponds to an effective reference capacitance level at calibration circuit 34 indicative of a low material level.

Thereafter, during the normal operating mode, the output of phase detector 32 is compared in threshold detector 36 to a reference input from calibration circuit 34 indicative of the reference capacitance level, and threshold detector 36 provides an output to material level indicating circuitry 38 when the sensed material capacitance exceeds the reference capacitance level by a predetermined amount which is selected as a function of material dielectric constant. If probe assembly 20 is placed in the upper portion of vessel 22 as shown in FIG. 1, such proximity would normally indicate a full tank or high-level condition. If, on the other hand, probe assembly 20 is disposed in the lower portion of tank 22, material would normally be in proximity to the probe assembly, and indeed would normally cover the probe assembly, so that absence of such proximity would indicate an empty tank or low-level condition.

Figure 2:
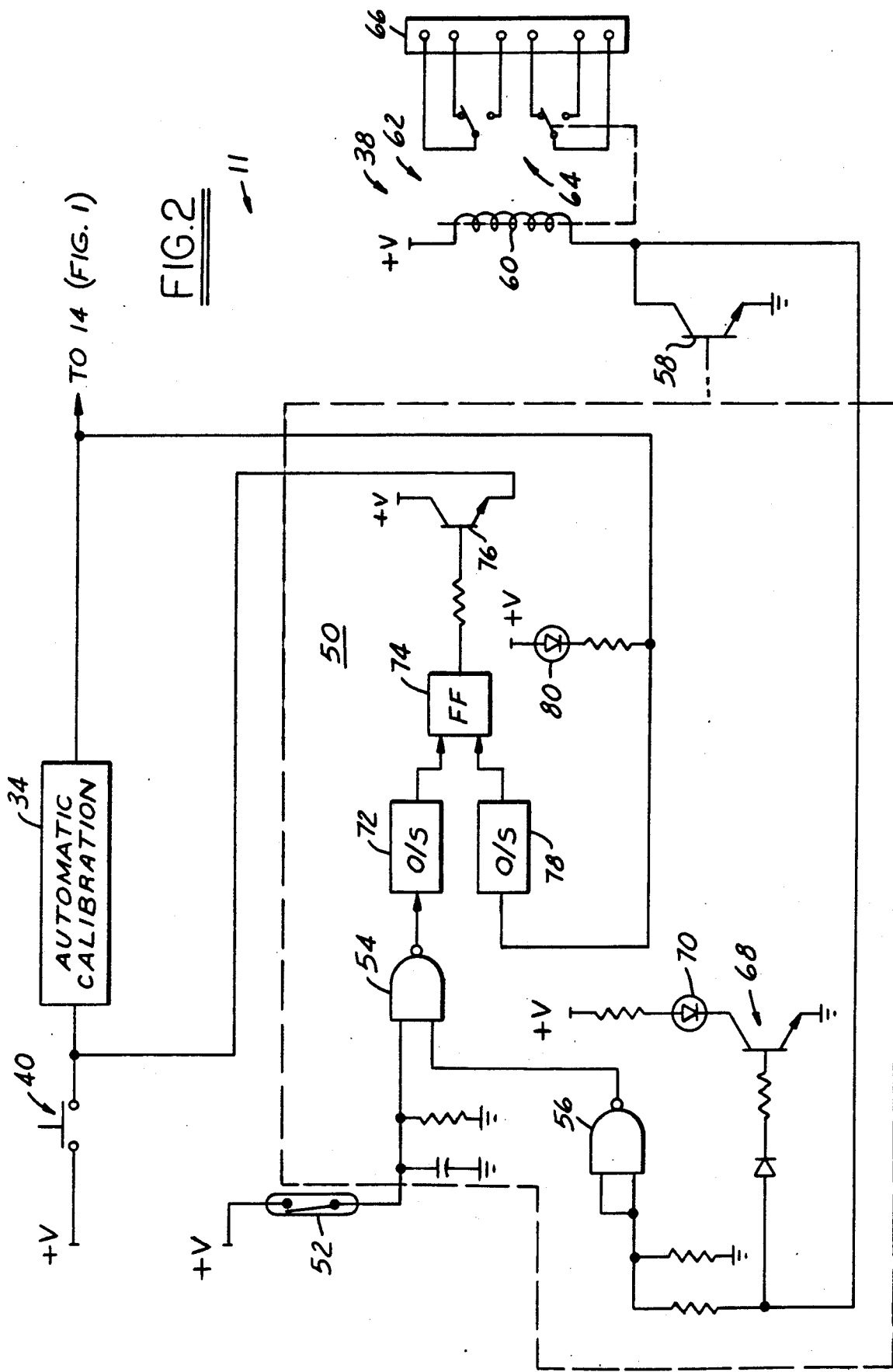
FIG. 2 is a fragmentary electrical schematic diagram of a portion of the system illustrated in block form of FIG. 1.
Figure 3:
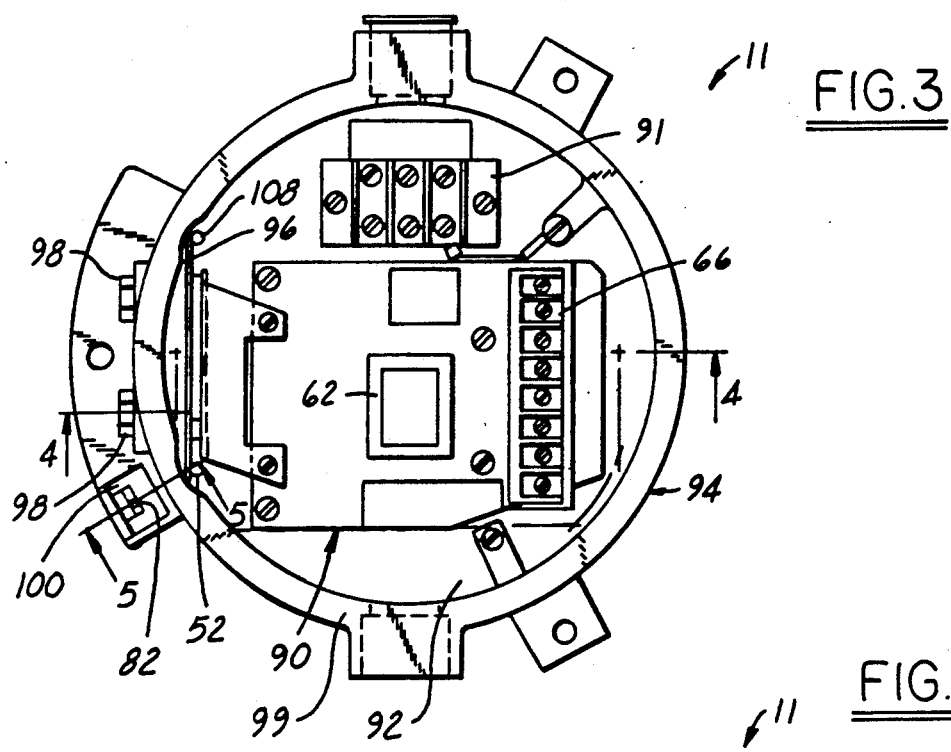
FIG. 3 is a plan view of one embodiment of the invention with housing cover removed.

To the extent thus far described, the circuitry of FIGS. 1-3 is similar to that disclosed in above-noted and above-referenced U.S. Pat. No. 4,499,766, with identical reference numerals being employed to facilitate cross-reference. Referring again to FIG. 1, a timer 42 receives an input from automatic calibration circuit 34 for timing or measuring the duration of the automatic calibration operation. The output of timer 42 is fed to an alarm circuit 44 and to a meter or the like 46 which may be empirically calibrated, for example, in units of thickness of material coated onto probe assembly 20. Alarm circuit 44 receives a variable threshold input from an adjustable circuit 48. Timer 42 may comprise an analog or digital clock. Alternatively, timer 42 may comprise a digital-to-analog converter having inputs connected to the digital outputs of the counter within circuit 14. Timer 42 thus effectively determines conditions at probe assembly 20, such as thickness of material coated thereon, as a function of duration of the calibration mode of operation.

In accordance with the preferred embodiment 11 of the present invention illustrated in FIG. 1 and fragmentarily in FIG. 2, an external calibration circuit 50 receives a first input from a reed switch 52 and provides an output to calibration circuit 34 for initiating a calibration operation in response to closure of reed switch 52. External calibration circuit 50 further receives a second input from material level indicating circuitry 38 for inhibiting initiation of a calibration operation when material is adjacent to the probe, and a third input from automatic calibration circuit 34 for resetting external calibration circuit 50 upon termination of a calibration operation. External calibration circuit 50 is illustrated in detail in FIG. 2 as comprising a gate 54 which receives a first input from reed switch 52 and a second input through an inverter 56 from the collector of the relay drive transistor 58 in material level indicating circuit 38. The collector of transistor 58 is also connected within indicating circuit 38 to the coil 60 of a relay 62 which has contacts 64 coupled to a terminal block 66 for indicating material level to external circuitry (not shown) as previously described. Transistor 58 is also connected within external calibration circuit 50 through a transistor 68 to energize an LED 70 when material is adjacent to the measurement probe. The output of gate 54 is fed through a one-shot 72 to the set input of a flip-flop 74. The output of flip-flop 74 is connected through a drive transistor 76 to the input of automatic calibration circuit 34 in parallel with switch 40. The output of automatic calibration circuit 34 is connected through a one-shot 78 to the reset input of flip-flop 74, and also drives an LED 80 within external calibration circuit 50 to indicate continuing execution of a calibration mode of operation.

In operation, the collector of transistor 58 in material level indicating circuit 38 is normally low and relay 62 is normally energized when material is spaced from measurement probe assembly 20 (FIG. 1). Inverter 56 thus provides a high-level enabling input to gate 54.

When a magnet is positioned adjacent to reed switch 52 so as to close the reed switch and couple a positive voltage to the other input of gate 54, the resulting transition at the output of gate 54 sets flip-flop 74 through one-shot 72 so as to close transistor switch 76. Closure of transition switch 76 provides a positive voltage input to automatic calibration circuit 34 in parallel with, and independently of, calibration switch 40. However, if material is adjacent to the measurement probe, which would yield a false calibration if the calibration operation were initiated, the enabling input to gate 54 from inverter 56 is low, thereby disabling operation of gate 54 independently of switch 52. If gate 54 is enabled and automatic calibration is initiated by closure of reed switch 52 and transition switch 76, a low output from automatic calibration circuit 34 not only enables operation of circuit 14 (FIG. 1) as described in the referenced patents, but also illuminates LED 80 and thereby indicates a calibration mode of operation. (It will be noted that LED 80 is also illuminated during a calibration operation initiated at switch 40.)

When the output of automatic calibration circuit 34 goes high, indicating termination of a calibration operation, flip-flop 74 is reset through one-shot 78, and normal operation may proceed as described above. It will be noted that, whereas switch 40 must be held closed during the duration of a calibration operation, flip-flop 74 and switch 76 cooperate to eliminate any requirement that magnet 82 be held adjacent to reed switch 52 during the duration of a calibration operation. It will also be noted that calibration through closure of manual switch 40 is not inhibited by level indicating circuit 38. Since calibration can be initiated without removing the apparatus cover in accordance with the present invention, it has been found that manual switch 40 is most often employed by repair technicians. It is advantageous to permit the repair technician to initiate calibration independently of actual material level.

Figure 4:
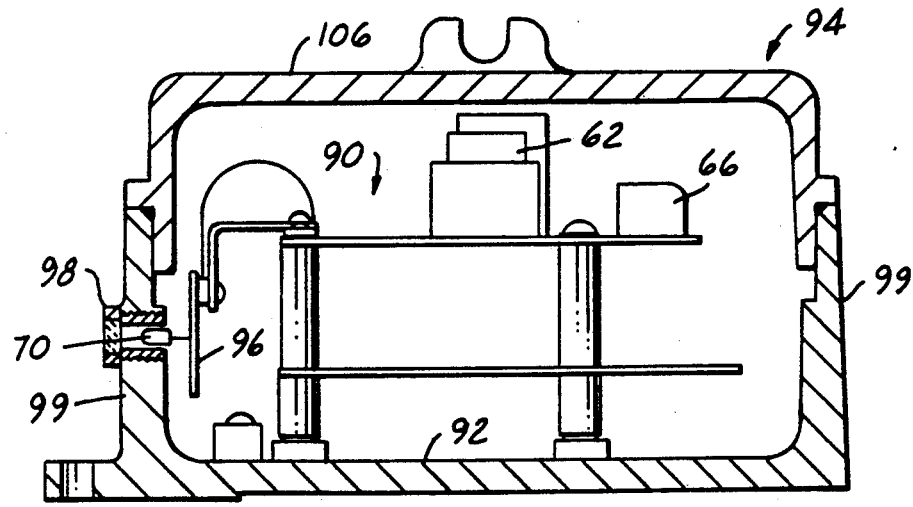
FIG. 4 is a sectional view of the apparatus of FIG. 3 taken substantially along the line 4—4 in FIG. 3 and illustrating the housing cover attached to the housing base.
Figure 5:
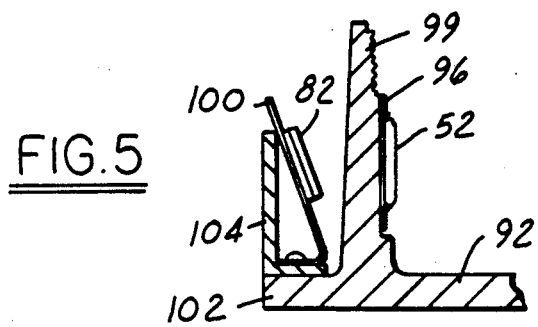
FIG. 5 is a fragmentary sectional view taken substantially along the line 5—5 in FIG. 3.

FIGS. 3-5 illustrate mechanical details of apparatus 11 in accordance with a presently preferred embodiment of the invention. Electronics heretofore described in detail in connection with FIGS. 1-2 are carried on a circuit board assembly 90 fastened to the base 92 of a housing 94 of suitable non-magnetic constructions such as cast aluminum. Probe assembly 20 (FIG. 1) is located remotely of housing 94 and is coupled to circuitry of assembly 90 through the terminal block 91. LEDs 70,80 and reed switch 52 are carried by a circuit board subassembly 96 positioned internally adjacent to a sidewall 99 of base 92, with LEDs 70,80 extending into translucent explosion-proof lenses 98. Reed switch 52 (FIGS. 3 and 5) is carried by circuit board 96 adjacent to an inside surface of wall 99, and magnet 82 is carried by a spring-mount 100 on a flange 102 of housing base 92 externally adjacent to reed switch 52. Spring-mount 100 normally rests in a position against a stop bracket 104 at which magnet 82 is spaced from reed switch 52 and does not close the reed switch. When it is desired to close reed switch 52 and thereby initiate a calibration operation from externally of housing 94, spring clip 100 is manually moved toward the outside surface of base wall 99 until magnet 82 closes reed switch 52 and initiates a calibration operation, such initiation being observable by the operator through energization of LED 80 and observation thereof through corresponding lens 98.

A cover 106 is removably fastened over base 92 so as to enclose the apparatus electronics in an explosion proof housing as previously described. Cover 106 may be removed by a technician for maintenance of the apparatus circuitry. Manual calibration switch 40 (FIGS. 1 and 2) is carried by circuit board assembly 90 and is accessable to the technician only when cover 106 is removed. In the embodiment 11 of FIGS. 3-5, circuit board 96 carries a second reed switch 108 internally adjacent to base wall 99 at a position spaced from reed switch 52. The apparatus circuitry may include external test facility as disclosed in U.S. Pat. No. 4,676,100 assigned to the assignee hereof and incorporated herein by reference. Such an arrangement is illustrated fragmentarily in FIG. 10, with the external calibration circuit 50 of FIG. 1 being replaced by an external test/calibration circuit 150 as disclosed in such patent. Reed switch 108 is provided for initiating a test operation in which operating characteristics of the system circuitry, specifically capacitance at resonant circuit 14 (FIG. 1) is the preferred embodiment of the referenced disclosure, to simulate presence of material at the system detection level independent of actual material level at the probe. Reed switch 108 is provided for initiating a test operation in accordance with that disclosure. A magnet and spring arrangement similar to that illustrated in FIG. 5 may be provided for actuation of reed switch 108. Alternatively, either or both of the reed switches 52,108 may be actuated by a fob 110 of the type illustrated in FIG. 7 and comprising a flat plate 112 of non-magnetic construction, such as plastic or aluminum, having the magnet 82 molded therein. Use of a fob 110 as in FIG. 7 has the advantage over the magnet and spring arrangement of FIGS. 3 and 5 in that a calibration and/or test operation can be initiated only by authorized personnel having possession of such a fob.

FIG. 8 illustrates a modified embodiment of the invention wherein magnet 82 is positioned within housing wall 99 between the wall and reed switch 52, thus holding reed switch 52 in a normally closed condition. In this embodiment, calibration is initiated by opening reed switch 52, which may be accomplished by bringing a modified fob 114 containing a section 116 of magnetically permeable material externally adjacent to magnet 82 and thereby effectively short-circuiting the flux of magnet 82 from reed switch 52. The embodiment of FIG. 8 has the advantage that reed switch 52 would be normally closed and thereby substantially isolated from the effects of extraneous magnetic fields.

It will be appreciated that the principles of the present invention are in no way limited to use of reed switches 52, which may be readily replaced by other devices such as Hall switches responsive to application of magnetic fields. Furthermore, the principles of the invention are in no way limited to use of magnetic flux energy for initiating a calibration operation from externally of the housing wall. FIG. 9 illustrates a modified embodiment of the invention wherein reed switch 52 is replaced by a photodetector 120 of suitable construction positioned adjacent to a translucent window 122 in housing wall 99. An external light source 124 of pulsed infrared energy is manually positioned by an operator in communication with detector 120 through window 122 and directs a pulse-coded optical signal therethrough onto the detector. The detector is coupled to a suitable decoder 126 for detecting a properly coded pulse train and thereby initiating a calibration operation at external calibration circuit 50 (FIGS. 1 and 2). It will be noted that the embodiment of FIG. 9 has the advantage over the magnetically coupled embodiments hereinabove discussed in that calibration may be initiated from remotely of the calibration and measurement circuitry. For example, where apparatus 11 is mounted at the top of a bin or vessel, calibration can be initiated from ground level by aiming light source 124 toward window 122 and actuating an appropriate switch for generating the pulsed light train.

FIG. 6 illustrates another embodiment 128 of the level indicating electronics of FIGS. 1-2 mounted on a circuit board assembly 130 within a sealed enclosure or housing 132 of non-magnetic construction, such as cast aluminum. Probe assembly 20, including measurement probe 18 and guard shield 26, integrally projects from the base 134 of housing 132. Probe assembly 20 is illustrated and described in greater detail in U.S. Pat. No. 4,499,641 assigned to the assignee hereof. LEDs 70 and 80 (FIG. 2) are affixed to a circuitboard 136 which is carried by the standoffs 138 adjacent to the removable cover 140 of housing 132. A molded lens unit 142 has skirts 143 which project through apertures in cover 140 and are internally affixed thereto by fasteners (not shown) so as to surround LEDs 70, 80. Reed switch 52 is also carried by circuit board 136 adjacent to a side wall of cover 140, and magnet 82 is carried by spring mount 100 normally resting against the flange 104 as previously described in connection with FIG. 5.

It will be apparent that the foregoing principles of the present invention may be readily applied without modification in the bridge-type systems of referenced U.S. Pat. No. 4,624,139.

The invention claimed is:

1. A system for indicating level of material in a vessel as a function of material capacitance comprising probe means adapted to be coupled to a vessel so as to be responsive to variations in capacitance at the vessel as a function of material level; circuit means coupled to said probe means such that operating characteristics of said circuit means vary as a function capacitance at said probe means; calibration means including means for initiating a calibration operation, means coupled to said circuit means for automatically varying operating characteristics of said circuit means during a said calibration operation, and means responsive to said circuit means during said calibration operation for detecting a predetermined operating characteristic at said circuit means, corresponding to a predetermined material level condition at said vessel, and for terminating said calibration operation when said predetermined operating characteristic is obtained; means responsive to variations in operation characteristics of said circuit means, including said probe means, from said predetermined operating characteristic for indicating level of material in said vessel; and a closed explosion-proof housing enclosing said circuit means, said calibration means and said variations-responsive means;

characterized in that said initiating means comprises flux-responsive switch means positioned within said housing and coupled to said automatically-varying means, and means for selectively directing flux energy onto said flux-responsive switch means from externally of said closed explosion-proof housing through a wall of said housing so as to selectively vary conductive condition at said flux-responsive switch means without opening said closed housing, said system further comprising means coupled to said variations-responsive means for inhibiting operation of said calibration means when material in the vessel is adjacent to said probe means.

2. The system set forth in claim 1 wherein said flux-responsive switch means comprises means responsive to magnetic flux energy.

3. The system set forth in claim 2 wherein said flux-responsive switch means comprises a reed switch.

4. The system set forth in claim 2 wherein said selectively-directing means comprises magnet means positioned adjacent to said flux-responsive switch means so as to normally activate said flux-responsive switch means responsive to flux energy from said magnet means, and means for selectively directing flux energy from said magnet means away from said flux-responsive switch means.

5. The system set forth in claim 2 wherein said flux-directing means comprises a permanent magnet and means for selectively positioning said magnet in flux communication with said switch means from externally of said housing.

6. The system set forth in claim 5 wherein said magnet-positioning means comprises means resiliently mounting said magnet adjacent to an external surface of said housing wall.

7. The system set forth in claim 1 wherein said flux-responsive switch means comprises light-responsive switch means responsive to light energy, a translucent window in said housing, and means for selectively directing light energy through said window onto said light-responsive switch means.

8. The system set forth in claim 7 wherein said selectively-directing means comprises means for directing pulse-coded light energy through said window onto said light-responsive switch means, and wherein said light-responsive switch means comprises means for decoding said pulse-coded light energy and initiating said calibration operation only in response to energy of preselected code.

9. The system set forth in claim 1 wherein said probe means and said housing form a one-piece explosion-proof assembly.

10. A system for indicating level of material in a vessel as a function of material capacitance comprising probe means adapted to be coupled to a vessel so as to be responsive to variations in capacitance at the vessel as a function of material level; circuit means coupled to said probe means such that operating characteristics of said circuit means vary as a function of capacitance at said probe means; calibration means including means for initiating a calibration operation, means coupled to said circuit means for automatically varying operating characteristics of said circuit means during a said calibration operation, and means responsive to said circuit means during said calibration operation for detecting a predetermined operating characteristic at said circuit means, corresponding to a predetermined material level condition at said vessel, and for terminating said calibration operation when said predetermined operating characteristic is obtained; and means responsive to variations in operating characteristics of said circuit means, including said probe means, from said predetermined operating characteristic for indicating level of material in said vessel;

characterized in that said calibration means further comprises means responsible to said variations-responsive means for inhibiting operation of said calibration means when material in the vessel is adjacent to said probe means.

* * * * *